Feb. 4, 1969     A. W. GESSNER     3,426,079
PROCESS FOR RECOVERING PARAFORMALDEHYDE
Filed Dec. 14, 1964
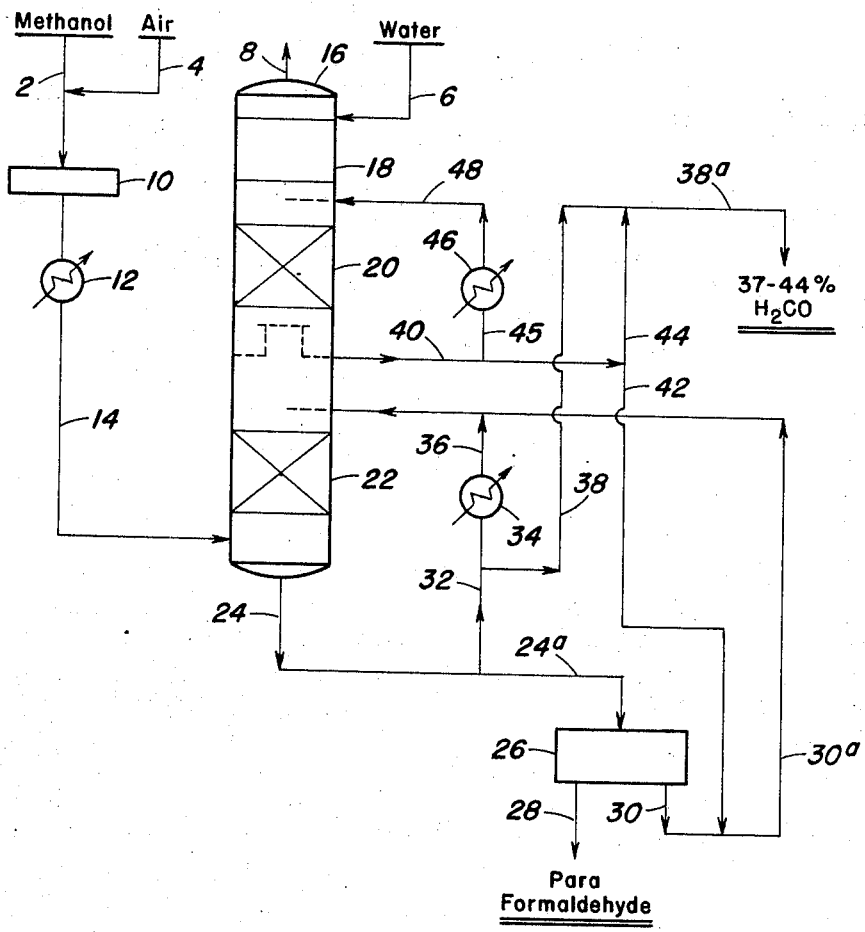
INVENTOR
Adolf W. Gessner
BY
*Flynn, Marn & Jangarathis*
ATTORNEYS 3,426,079
PROCESS FOR RECOVERING
PARAFORMALDEHYDE
Adolph W. Gessner, Montclair, N.J., assignor to The Lummus Company, New York, N.Y., a corporation of Delaware
Filed Dec. 14, 1964, Ser. No. 417,926
U.S. Cl. 260—615.5
Int. Cl. C07c *47/10;* C07d *19/00*
7 Claims

ABSTRACT OF THE DISCLOSURE

An improved process for recovering paraformaldehyde from a formaldehyde containing gas in a multizone formaldehyde absorber wherein a portion of the formaldehyde solution withdrawn from the lowest zone of the absorber is cooled to effect crystallization of paraformaldehyde. The mother liquor from the crystallization is then mixed with a warmer less concentrated formaldehyde solution withdrawn from an intermediate zone of the absorber to effect heating thereof to a temperature above the point of polymer formation. The mixture is then recycled to the lowest zone of the absorber.

---

This invention relates in general to the recovery of formaldehyde products from gaseous mixtures containing same and, more particularly, the invention relates to the recovery of solid paraformaldehyde and 30–37 weight percent formalin solutions. The invention is characterized by minimizing the production of formaldehyde polymers, and by controlling the amount and distribution of formic acid.

Paraformaldehyde is generally prepared from aqueous solutions of formaldehyde containing from about 50 to 70 weight percent formaldehyde by bringing such a solution from an initial temperature of 55–80° C. to about 15–35° C. in a suitable crystallizer vessel, and withdrawing therefrom a slurry consisting of solid paraformaldehyde and a mother liquor containing 40 to 60 weight percent $H_2CO$. The slurry is then centrifuged and the paraformaldehyde collected for use or further treatment; the mother liquor is returned to the process in which the 50 to 70 weight percent solution is obtained.

To prepare the 50 to 70 weight percent formaldehyde solution, vapor phase catalytic oxidation of methanol and air is generally employed. This produces a gaseous mixture of formaldehyde, water vapor, nitrogen, CO, etc. The reactor outlet gas is generally cooled and then fed into a multi-stage absorber, from which the bottom liquid outlet stream is the 50 to 70 weight percent formaldehyde solution referred to hereinabove. The outlet temperature of this stream is generally within the range of 55–80° C.

Commonly, the absorber is divided into a plurality (3 or more) packed or tray sections, each with an associated recirculation system (pumps, piping, etc.) and cooler. The relatively concentrated 50 to 70 weight percent solution is withdrawn from the liquid circulating through the lowermost section. A 37–44 weight percent formaldehyde solution may be withdrawn from the liquid circulating through the intermediate section or sections. Water is supplied to the uppermost section for passage countercurrent to the gas, and gas essentially stripped of all formaldehyde content is passed out through the top of the absorbing column.

One of the problems encountered in the above type of recovery system is that formic acid has a tendency to form in the liquid circulating in the lower portion of the absorber. This is because the temperature conditions in this portion of the absorber favor the following reaction:

$$2H_2CO \rightarrow CH_3OH + HCOOH$$

which is known as the Canizzaro reaction. This formic acid circulates in the lower section of the absorber and will be withdrawn in the solid paraformaldehyde product, because formic acid exerts only a low vapor pressure above dilute aqueous solutions. The removal of formic acid from the solid paraformaldehyde product is most troublesome.

A second problem with the above described recovery system is that the mother liquor leaving the centrifuge at about 15 to 35° C., and containing 40 to 60 weight percent formaldehyde, tends to build up formaldehyde polymer in the return piping, pumps, etc. unless it is promptly heated to a higher temperature (depending on formaldehyde concentration). Build-up of formaldehyde polymer in the processing equipment requires frequent shutdown of the plant in order to keep the throughput at a satisfactory level.

It is accordingly a general object of the present invention to provide an improved process for the recovery of formaldehyde products which overcomes and avoids the foregoing defects of prior art processes.

Another object of the present invention is to provide an improved process for the recovery of solid paraformaldehyde and formalin solutions wherein the major portion of any formic acid which is formed is drawn off in the formalin solution in preference to the solid paraformaldehyde.

Still another object of the present invention is to provide an improved process for the recovery of paraformaldehyde and formalin solutions wherein the buildup of formaldehyde polymer in processing equipment is substantially eliminated.

Various other objects and advantages of the invention will become clear in the course of the following description of an embodiment thereof, and the novel features will be particularly pointed out in connection with the appended claims.

In essence, the present invention is based on the usage of two of the recirculating liquid streams within the absorber to accomplish the objects of the invention. In particular, the stream recirculating through the middle portion of the absorber is used, in part, to heat the recycled mother liquor stream immediately so as to prevent polymer formation in the process equipment. A second portion of this stream is drawn off as a formalin solution product. The remaining portion is cooled and returned to the absorber. The absorber bottoms are also put to three separate uses. One fraction is passed directly to the crystallizer, one fraction is cooled and recycled to the lower section of the absorber, and a third fraction is mixed with the formalin solution product, thereby increasing its concentration (37%) level. This also carries off a substantial portion of any formic acid formed. By drawing off formic acid in solution, rather than in the solid paraformaldehyde product, the removal thereof may be simply and economically accomplished, as for example by anion exchange.

A better understanding of the invention will be gained by referring to the following detailed description thereof, taken in conjunction with the accompanying single drawing, which is a schematic flow sheet or flow diagram illustrating an embodiment of the invention.

With reference to the drawing, methanol in line 2 and air in line 4 are mixed and passed to a vapor phase catalytic oxidation reactor, indicated generally at 10, wherein a gaseous mixture of formaldehyde, water vapor, nitrogen, CO, etc. is formed. The reacted mixture is passed to a cooler 12, wherein the temperature is reduced from about 250° C. to 125–200° C., and the thus cooled mixture is passed in line 14 into the absorber indicated generally at 16.

As can be seen, absorber 16 is divided into three sections: an upper section 18, a middle section 20 and a lower section 22. Water in line 6 is passed into the upper section 18, stripped gases are vented through line 8, and concentrated solution (50 to 70%) is withdrawn at the bottom of the absorber through line 24. Both the middle section and the lower section of absorber 16 are provided with recirculation and cooling means; in middle section 20 this comprises cooler 46 and lines 40, 45 and 48, and in lower section 22 this recirculation system comprises cooler 34 and lines 24, 32, 36 and 30a. Such recirculation systems, including heat exchangers 34 and 46, are common in prior art recovery systems. Other ancillary equipment (pumps control systems, etc.) is not shown. A portion of the concentrated formaldehyde solution in line 24 is passed in line 24a to a crystallizer and centrifuge, indicated generally at 26, and solid paraformaldehyde product formed and separated therein is withdrawn through line 28. The mother liquor separated in the centrifuge is passed into line 30 and recirculated in line 30a to the absorber. In accordance with the present invention, however, a warmer recirculating liquid from the middle section of the absorber is immediately mixed with the mother liquor as it passes out of the centrifuge in line 30, this liquid passing through lines 40 and 42, to line 30. In this fashion, the temperature of the mother liquor coming from the centrifuge is immediately raised above the polymer formation point.

The concentration of the formalin solution in line 40 is generally about 27 weight percent. Of course, the portion which is recycled directly through line 45, cooler 46 and line 48, retains this concentration. The portion passing in line 42 to line 30 serves to reduce the concentration of the mother liquor in line 30 from 40–60% to about 33%. As the desired product is a 37 to 44 wt. pct. formaldehyde solution, it is desired to raise the concentration of the solution in line 44 for product purposes. To this end, a fraction of the liquid recirculating in line 32, in the bottom portion of the absorber, is taken off in line 38 and mixed with the liquid in line 44, to give the proper concentration of the product solution in line 38. This step has the additional advantage of drawing off liquor containing formic acid that is formed in the lower section 22 of absorber 16, thus controlling the concentration of this troublesome material within acceptable limits. Formic acid in the solution withdrawn in line 38a may be readily removed by anion exchange.

It is believed that understanding of the invention will be enhanced by referring to the following specific example of an embodiment thereof, which is intended to be illustrative only and should not be construed in a limiting sense.

EXAMPLE

A plant built in accordance with the present invention has a capacity of 40 million pounds per year of formalin (as 37 weight percent solution). Operation of the catalytic vapor phase oxidation plant is conventional and well known to those skilled in the art, and will not be described here.

The mixed gaseous stream from the catalytic oxidation is cooled in exchanger 12 to about 125–200° C. and passed to absorber 16. Water at 30° C. is supplied to absorber 16 through line 6 at a rate of 31.6 lb. mols per hour. Gas vented in line 8 is mostly nitrogen, CO and water vapor; exit temperature of this gas is about 30° C.

Bottoms from absorber 16, in line 24, is a 60 wt. pct. formaldehyde solution at 70–75° C. which is divided into three streams in lines 32, 38 and 24a. About 95 lb. mols per hr. are passed thru line 24a into crystallizer and centrifuge units 26, where the temperature is reduced to 20° C. Paraformaldehyde (91 wt. pct. $H_2CO$) is withdrawn through line 28 at a rate of 30.3 lb. mols per hr. The mother liquor in line 30 contains 40 wt. pct. $H_2CO$ and is also at 20° C. This is immediately mixed with liquid in line 42 at 35° C. containing 27 wt. pct. $H_2CO$, to form a recycle stream of 33 wt. pct. $H_2CO$ at 29° C. flowing at a rate of 163.4 lb. mols per hr. As the temperature of incipient polymer formation of a stream of this concentration is 27° C., it will be seen that this problem is essentially obviated.

A second fraction of the absorber bottoms in line 38 is mixed with the 27 wt. pct. $H_2CO$ liquid in line 44 to provide a 37 wt. pct. product solution in line 38a. As the bottoms are at 70–75° C. and the stream in line 44 is at 35° C., the product is delivered at about 43–45° C. The flow rate of this product stream is 137.2 lb. mols per hour.

A complete balance for the above-described operation is set forth hereinbelow in Table I.

TABLE 1

| Line | Lb. mols/hr. $H_2CO$ | Lb. mols/hr. $H_2O$ | Total | Temp., ° C. | Weight percent $H_2CO$ |
|---|---|---|---|---|---|
| 4 | 61.7 | 102.3 | 164.0 | 125–200 | |
| 14a | 44.9 | 50.2 | 95.1 | 70–75 | 60.0 |
| 28 | 26.0 | 4.3 | 30.3 | 20 | 91.0 |
| 20 | 18.7 | 45.8 | 64.5 | 20 | 40.0 |
| 32 | 17.9 | 81.0 | 98.9 | 35 | 27.0 |
| 40a | 26.6 | 126.8 | 163.4 | 29 | 33.0 |
| 38 | 17.6 | 19.6 | 37.2 | 70–75 | 60.0 |
| 34 | 18.1 | 81.9 | 100.0 | 35 | 27.0 |
| 48a | 35.7 | 101.5 | 137.2 | 43–45 | 37.0 |
| 3 | 0 | 31.6 | 31.6 | 30 | 0 |
| 6 | (1) | 28.2 | 28.2 | 30 | |
| 8 | | | | | |

[1] Negligible.

Various changes in the details, steps, materials and arrangements of parts, as described hereinabove to illustrate the invention, may be made by those skilled in the art within the scope of the invention as defined in the appended claims.

What is claimed is:
1. Process for the recovery of paraformaldehyde from a formaldehyde-bearing gaseous mixture comprising:
  passing said mixture through an absorption zone countercurrent to a liquid absorbing medium, said absorption zone having a plurality of stages;
  withdrawing a first solution of at least 50 weight percent formaldehyde from the lowermost of said stages;
  withdrawing a second, less-concentrated solution from an intermediate stage of said absorption zone;
  passing a portion of said first solution to a crystallization and separation zone;
  recovering solid paraformaldehyde and a formaldehyde-bearing third solution as separate fractions from said crystallization and separation zone;
  immediately mixing said third solution with a portion of said second solution, whereby the temperature of said third solution is raised above the point of polymer formation; and
  recycling the resulting mixed solution to the lowermost stage of said absorption zone.

2. The process as claimed in claim 1, and additionally comprising mixing a portion of said first solution and a portion of said second solution, and withdrawing the resulting mixture as a liquid product.

3. The process as claimed in claim 2, and additionally comprising recycling the remaining portion of said first solution directly to the lowermost stage of said absorption zone, and recycling the remaining portion of said second solution to the intermediate stage of said absorption zone.

4. The process as claimed in claim 3, wherein said first solution contains about 50–70 weight percent formaldehyde; said second solution contains about 25–30 weight percent formaldehyde and is withdrawn at about 35° C., said mixed second and third solutions contain about 33 weight percent formaldehyde and are at about 29° C., and said liquid product contains about 37–44 weight percent formaldehyde.

5. Process for the recovery of paraformaldehyde and formalin from a formaldehyde-bearing gas stream comprising:
  absorbing said formaldehyde in water in a multistage absorption zone;
  withdrawing a 50–70 wt. pct. solution from the lowermost stage in said zone and a 25-30 wt. pct. solution from an intermediate stage in said zone;

cooling a first portion of said 50-70 wt. pct. solution to about 15-20° C. and recovering therefrom a solid paraformaldehyde product and a mother liquor containing 40-60 wt. pct. formaldehyde;

immediately mixing said mother liquor with a first portion of said 25-30 wt. pct. solution to heat the same above the point of polymer formation;

recycling the resulting mixture to said lowermost stage in said absorption zone;

mixing a second portion of said 50-70 wt. pct. solution with a second portion of said 25-30 wt. pct. solution; and withdrawing said mixed second portions as a 37-44 wt. pct. liquid product.

6. The process as claimed in claim 5, and additionally comprising cooling the remaining portion of said 50-70 wt. pct. solution and recycling the same to the lowermost stage of said absorption zone, and cooling the remaining portion of said 25-30 wt. pct. solution and recycling the same to said intermediate stage of said absorption zone.

7. In a process for the crystallization and recovery of paraformaldehyde from a 50-70 wt. pct. formaldehyde solution produced in an absorption zone, the improvements comprising, cooling said solution to about 15-20° C. to crystallize paraformaldehyde;

recovering said paraformaldehyde and a 40-60 wt. pct. formaldehyde solution as separate fractions;

immediately mixing said 40-60 wt. pct. solution with a warmer, formaldehyde-bearing solution so as to raise the temperature thereof above the point of polymer formation; and recycling said mixed solution to said absorption zone.

References Cited

UNITED STATES PATENTS 3,277,179 10/1966 Sze _____ 260—606 X
2,092,422 9/1937 Naujoks _____ 260—606 X LEON ZITVER, *Primary Examiner.*

R. H. LILES, *Assistant Examiner.*

U.S. Cl. X.R.

260—606

UNITED STATES PATENT OFFICE
CERTIFICATE OF CORRECTION

Patent No. 3,426,079                      February 4, 1969

Adolph W. Gessner

It is certified that error appears in the above identified patent and that said Letters Patent are hereby corrected as shown below:

Column 4, lines 13 to 25, cancel TABLE 1 in its entirety and insert the following:

TABLE 1

| Line | Lb. mols/hr. $H_2CO$ | Lb. mols/hr. $H_2O$ | Total | Temp., °C. | Weight percent $H_2CO$ |
|---|---|---|---|---|---|
| 14 | 61.7 | 102.3 | 164.0 | 125-200 | -------- |
| 24a | 44.9 | 50.2 | 95.1 | 70-75 | 60.0 |
| 28 | 26.0 | 4.3 | 30.3 | 20 | 91.0 |
| 30 | 18.7 | 45.8 | 64.5 | 20 | 40.0 |
| 42 | 17.9 | 81.0 | 98.9 | 35 | 27.0 |
| 30a | 36.6 | 126.8 | 163.4 | 29 | 33.0 |
| 38 | 17.6 | 19.6 | 37.2 | 70-75 | 60.0 |
| 44 | 18.1 | 81.9 | 100.0 | 35 | 27.0 |
| 38a | 35.7 | 101.5 | 137.2 | 43-45 | 37.0 |
| 6 | 0 | 31.6 | 31.6 | 30 | 0 |
| 8 | negligible | 28.2 | 28.2 | 30 | -------- |

Signed and sealed this 28th day of April 1970.

(SEAL)
Attest:

EDWARD M. FLETCHER, JR.                      WILLIAM E. SCHUYLER, JR.
Attesting Officer                              Commissioner of Patents